United States Patent [19]

Ragard et al.

[11] 3,783,488

[45] Jan. 8, 1974

[54] FILM MOUNTED ELECTRONIC COMPONENT INSERTION MACHINE

[75] Inventors: Phillip A. Ragard, Binghamton; Jim Paton, Johnson City, both of N.Y.

[73] Assignee: Universal Instruments Corporation, Binghamton, N.Y.

[22] Filed: July 5, 1972

[21] Appl. No.: 269,168

[52] U.S. Cl. .............................................. 29/203 B

[51] Int. Cl. .............................................. H05k 13/04

[58] Field of Search ....................... 29/203 B, 203.5, 29/203 MW, 203 R

[56] References Cited

UNITED STATES PATENTS 2,893,010 7/1959 Stuhre .............................. 29/203 B

*Primary Examiner*—Thomas H. Eager
*Attorney*—Fidelman, Wolffe, Leitner & Hiney

[57] ABSTRACT

An apparatus for severing electronic components from a film strip upon which they are mounted; for bending the leads of the component; and for inserting the components into a circuit board.

21 Claims, 13 Drawing Figures

FILM MOUNTED ELECTRONIC COMPONENT INSERTION MACHINE

FIELD OF THE INVENTION

The present invention is directed towards an improved insertion apparatus for axial lead components and more particularly to an insertion apparatus which inserts electronic components which are mounted on a filmstrip.

DESCRIPTION OF PRIOR ART

Heretofore, tape mounted axial lead components have been fed to an insertion head which is adapted in sequence to sever the leads of a present component in order to separate such component from a pair of spaced carrier tapes; bend the severed leads at right angles to the axis of the separated component; and finally drive the bent leads into performed apertures provided in a circuit board disposed below the insertion head.

SUMMARY OF THE INVENTION

The present invention is adapted to insert filmstrip mounted axial lead electronic components fed to an insertion head wherein said insertion head is adapted in sequence to sever the leads of a present component in order to separate such component from the filmstrip; bend the severed leads at right angles to the axis of the separated component; and finally drive the bent leads into performed apertures provided in a circuit board disposed below the insertion head.

OBJECTS OF THE INVENTION

The primary object of the present invention is to provide an apparatus for inserting film strip mounted electronic components.

The nature and mode of operation of the insertion apparatus of the present invention will be more clearly understood by reference to the following description taken with the accompanying drawings, wherein.

DESCRIPTION OF THE PREFERRED EMBODIMENTS

Figures 5, 6, 7:
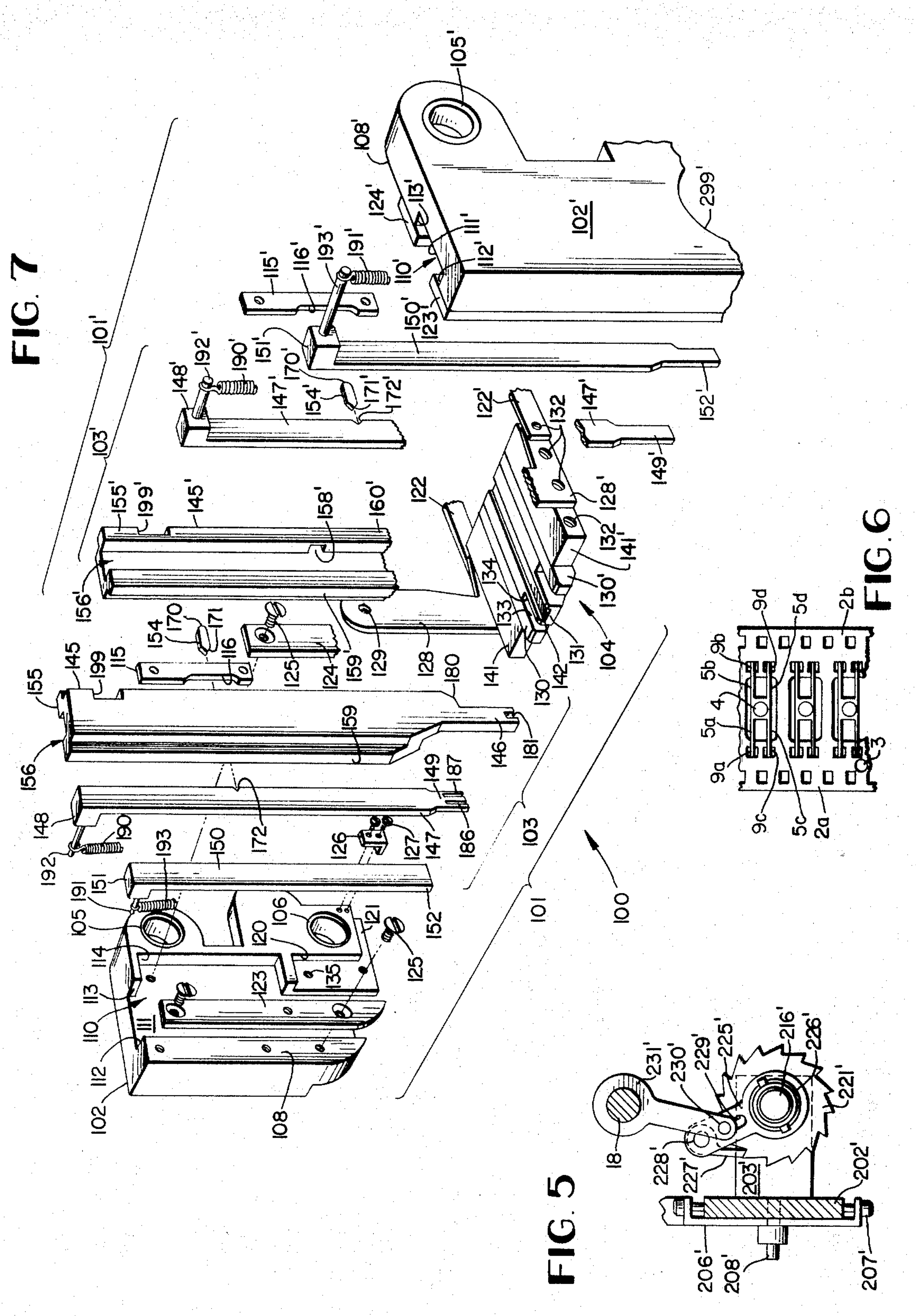
FIG. 5 is a sectional view taken generally along the line 5—5 of FIG. 1.
FIG. 6 is a view of a film mounted component.
FIG. 7 is an exploded view of the insertion head of the present invention.
Figure 8:
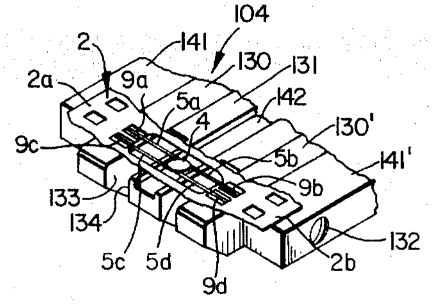
FIG. 8 is a perspective view of a film mounted component being supported by component support subassembly.

The insertion apparatus of the present invention, which is generally designated as 1 in the drawings, is adapted to process components mounted on film strips as shown in FIG. 6. The components have two pairs of leads 5*a*,5*c* and 5*b*,5*d* extending laterally from opposite sides of a body portion 4 and mounted on film edges 2*a* and 2*b*, respectively at 9*a*,9*c* and 9*b*,9*d*. The film edges 2*a* and 2*b* have the normal sprocket holes for ease of handling. The additional aperture 3 in film edge 2*a* indicates that the adjacent component is defective and thus should not be used. As will be discussed with respect to FIG. 10, the aperture 3 can be detected by a photoelectric or pneumatic sensor and the insertion device of the present invention will not insert the defective component.

The apparatus of the present invention is adapted in sequence to feed insertion film 2; sever leads 5*a*,5*b*,5*c* and 5*d* of successively present components 4 in order to separate a presented component from film 2*a* and 2*b*; deform the free end portions of the severed leads to provide generally L-shaped leads; and insert the deformed leads into preformed apertures 6*a*,6*b*,6*c* and 6*d* provided in a circuit board, designated at 6. After insertion of the deformed leads, the free ends thereof, which project below circuit board 6, may be clinched to retain them in inserted position by any suitable clinching mechanism 7, which includes clinching devices 7*a* and 7*b*, as indicated in phantom in FIG. 9*d*.

Figure 10:
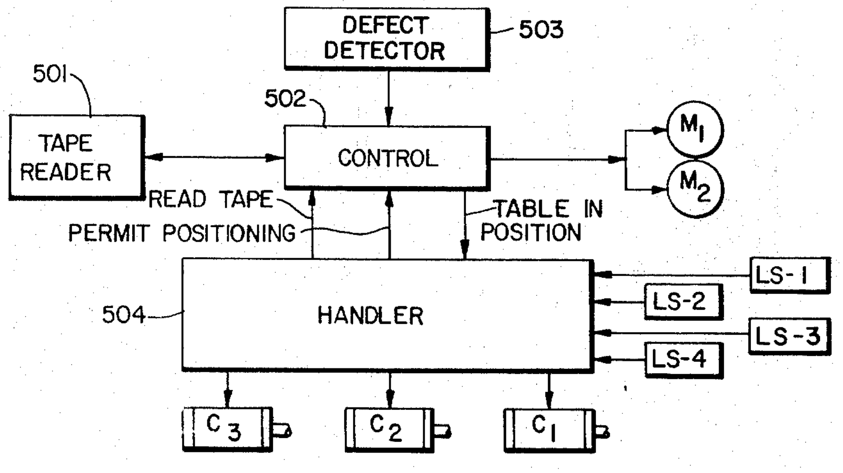
FIG. 10 is a block diagram of the electrical and pneumatic circuit employed with the apparatus of the present invention.

Circuit board 6 may be adjustably positioned below the insertion apparatus by any conventional supporting apparatus, not shown, which is adapted to be driven in X,Y direction by electric motors $M_1$ $M_2$, shown in FIG. 10.

Referring to FIGS. 1–4, it will be seen that apparatus 1 generally includes framework 10, which includes a generally U-shaped metal casting 11 having vertically disposed backwall portion 12 and leg portions 13,13'. Leg portions 13,13' are provided with aligned bore openings adapted to support a plurality of spaced parallel shafts including insertion head drive shaft 14; insertion head transverse guide shafts 15 and 16; insertion tape advancing shaft 18; and insertion head support return shaft 19. Leg portions 13,13' are further shown in FIGS. 1 and 3 as having mounting flange portions 20,20' which are affixed thereto by bolts 21 and 22 and 21' and 22', respectively.

The structural arrangement of apparatus 1 thus far described is adapted to support an insertion head assembly, generally designated as 100; a component film guide and feeding assembly which is generally designated as 200 and adapted to present a component to head assembly 100 for processing once during each operational cycle of the apparatus; and an insertion head actuating mechanism, which is generally designated as 300 and adapted to operate assembly 100 each time a component is presented thereto.

Figure 1:
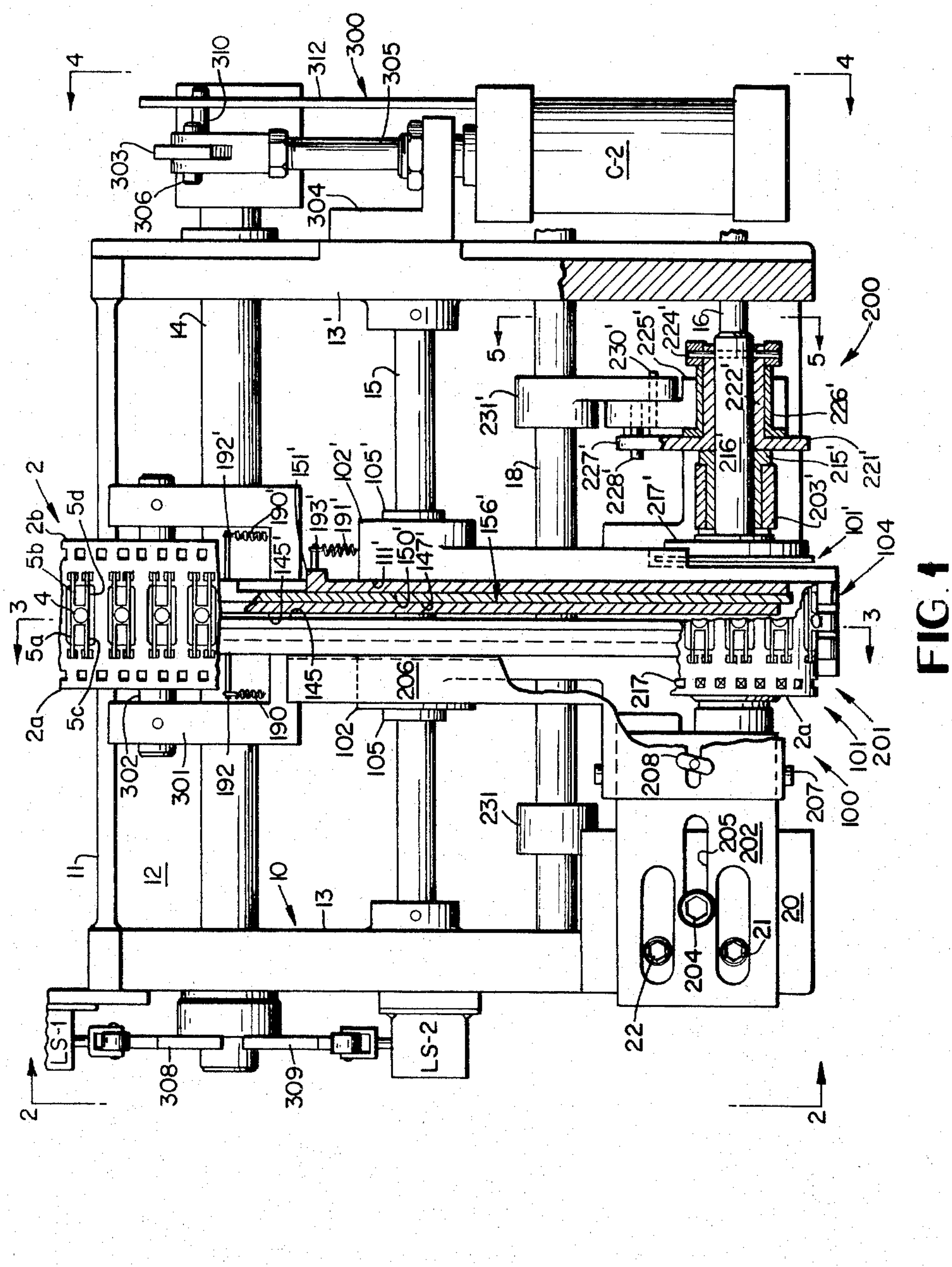
FIG. 1 is a front elevational view of the insertion apparatus according to the present invention having parts broken away for purposes of clarity.
Figure 3:
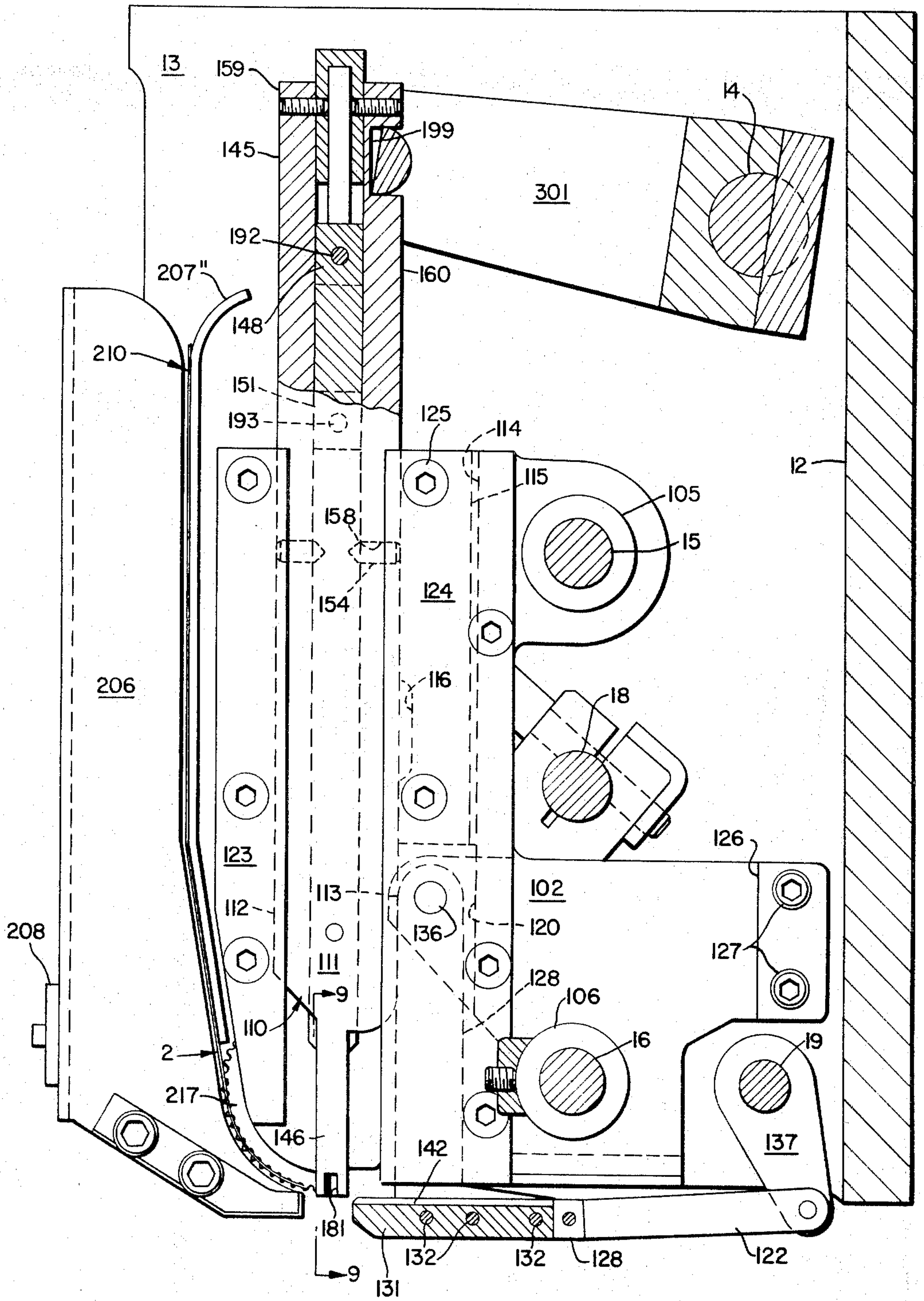
FIG. 3 is a sectional view taken along the line 3—3 of FIG. 1.

Insertion head assembly 100 is shown particularly in FIGS. 1, 3 and 7 as including a pair of relatively spaced apart insertion head sections 101,101' which are of mirror image construction and disposed on opposite sides of a vertically extending reference plane 8. In that each of sections 101,101' includes like elements, primary reference will be made to Section 101; it being understood, however, that like elements of section 101' will be indicated by primed numbers.

Sections 101 and 101' are shown particularly in FIGS. 3 and 7 as including base casting members 102,102', which are adapted to slidably support lead severer and former and lead driver subassemblies 103,103' and to pivotably support a component lead support subassembly 104,104'.

Base casting member 102 is shown particularly in FIGS. 3 and 7 as having a pair of ball bearing sleeve inserts 105 and 106, which are adapted to slidably receive guide shafts 15 and 16, respectively. Facing surface portions 108,108' of base castings 102,102' are cut out to provide lengthwise extending slots 110,110' having a bottom wall 111,111' and side walls 112, 112' and 113,113' which are adapted to slidably receive sub-assemblies 103,103' respectively. The facing surface portions 108,108' are further provided as shown particularly in the case of base casting 102 with a first slot side opening recess 114, which is adapted to receive a severing and forming tool cam plate 115 having a camming recess 116; a second slot side opening recess 120, which is adapted to receive lead support subassembly 104; and a bottom edge slot 121; which is adapted to slidably receive support subassembly driver 122. Suitable retention plates 123 and 124 may be affixed to facing surface 108 of base casting member by machine screws 125 for the purpose of maintaining cam plates 115 and subassemblys 103,104 in position. A generally L-shaped bracket 126, which is mounted on base casting member 102 by machine screws 127 cooperates with retention plate 124 to maintain support subassembly driver 122 within edge slot 121.

In FIGS. 3, 7 and 9, support subassembly 104 is shown as including pivot arms 128,128' having a pivot pin shaft 129,129' affixed adjacent the upper end thereof and support subassembly drivers 122,122' affixed adjacent the lower end thereof; spacers 141,141'; lead severing blocks 130,130'; and component support block 131. Spacers 141,141; severing blocks 130,130' and component support 131 are united to each other as well as to pivot arms 128,128' by machine screws 132. Support subassembly drivers 122,122' are also affixed to pivot arms 128, 128' by machine screws 132.

Figure 9A:
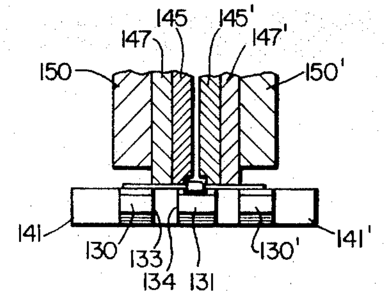
FIGS. 9A–9D are sectional views taken generally along the line 9—9 of FIG. 3 having portions broken away for clarity and illustrating successive steps in the component lead severing, bending and inserting sequence.
Figure 9B:
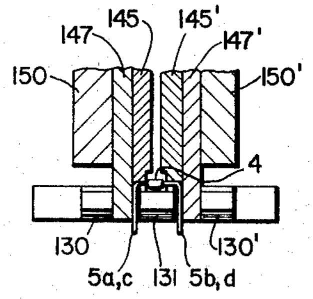

Subassembly 104 is adapted to be pivotally supported within base casting member recess 120 by means of pivot pin 129, whose ends are received respectively within bore opening 135 of base casting member 102, shown only in FIG. 7, and bore opening 136 of retention plate 124 shown only in FIG. 3. When thus supported, subassembly 104 is adapted to be normally maintained in its supporting position, as illustrated in FIGS. 9A and 9B, by means of an assembly shown in FIGS. 3 and 4. This assembly includes support subassembly driver 122, link 137 carried on return shaft 19, and a tension spring 138, which has its respective ends affixed to leg portion 13' by pin support 139, and to return shaft 19 by pin 140. Preferably subassembly 104 is prevented from being pivoted in a clockwise direction past its supporting position as viewed in FIG. 2, due to the operation of tension spring 138 by abutting engagement with subassembly 103.

Figure 4:
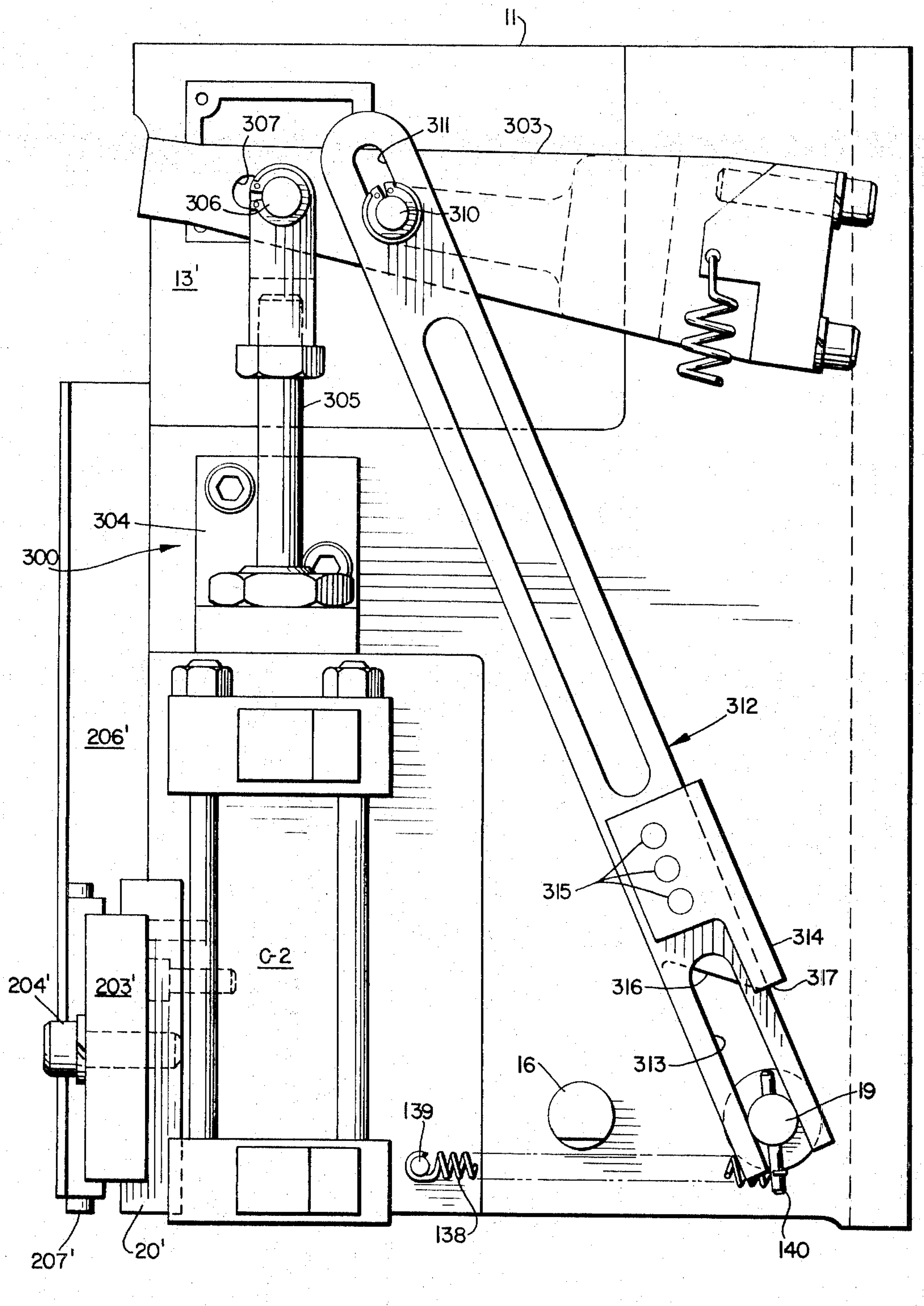
FIG. 4 is a side elevational view taken generally along the line 4—4 of FIG. 1.
Figure 9C:
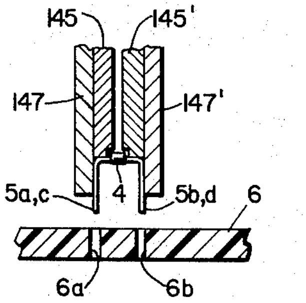

Subassembly 104 is pivoted on pivoting arm 128 from its operative or component supporting position as shown in FIGS. 9A and 9B in a counterclockwise direction into an inoperative position as shown in FIGS. 3 and 4 by support driver 122, link 137 and return shaft 19 so as to permit subassembly 103 to move downwardly towards circuit board 6 into a component lead insertion position as shown in FIG. 9C. In this retracted position, spring 138 is under increased tension and will return shaft 19 and consequently subassembly 104 to its normal operative position when permitted to by assembly 300 to be hereinafter discussed.

Figure 2:
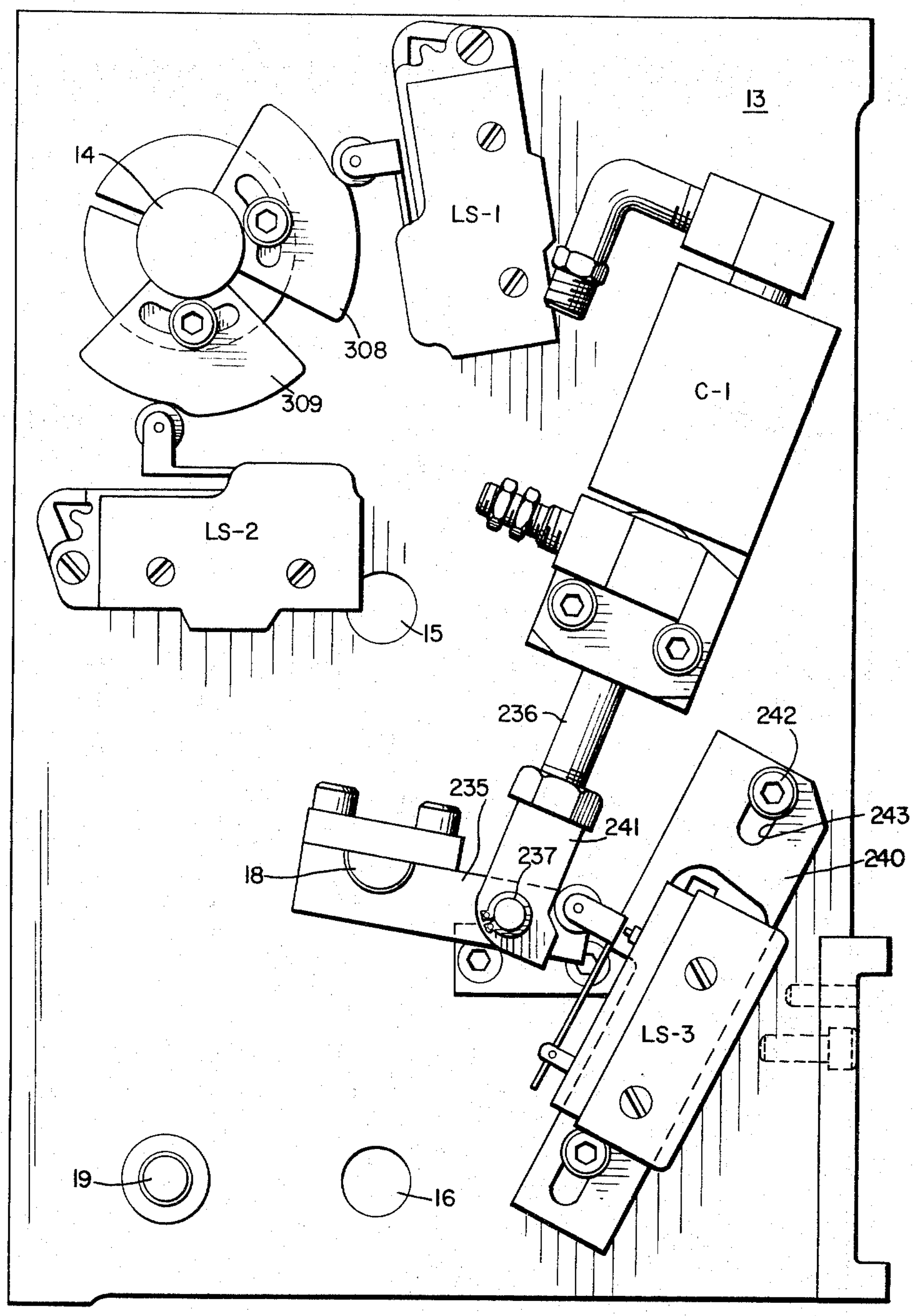
FIG. 2 is a side elevational view taken generally along the line 2—2 of FIG. 1.

Lead severer, former, and driver subassembly 103 is shown particularly in FIGS. 2 and 7, as including a lead driving member 145 having an integrally formed driving tool 146 disposed adjacent the lower end thereof; a lead severing and forming member 147 having integrally formed abutment 148 and severing and forming tool 149 disposed adjacent the upper and lower ends thereof, respectively; a spacer member 150 having an integrally formed abutment 151 disposed adjacent the upper end thereof, and severing and forming member cam pin 154.

More specifically, driving member 145 is shown as having a side wall surface 155 in which is disposed a lengthwise extending slot 156 adapted to slidably receive severing and forming member 145 and spacer member 150, which are arranged in juxtaposed relationship. Further, driving member 145 is provided with relatively off-set slot 158, which extends transversely from slot 156 through member rear wall surface 160, and is adapted to slidably receive cam pin 154. It will be understood that when cam pin 154 is provided with a curved end portion 170, which is adapted to be selectively projected through rear wall surface 160 of member 156 into cooperating engagement with recess 116 of cam plate 115, and a wedge-shaped portion 171 which is adapted to selectively project into slot 158 into cooperating engagement with a V-shaped slot 172 provided in lead severing and forming member 147.

When subassembly 103 is slidably positioned within base casting member slot 110, driving member side wall surface 155 and the outwardly facing side surface of spacer member 150 are disposed in sliding surface engagement with slot side walls 112 and 113, respectively, as generally shown in FIG. 3. When subassembly 103 is thus assembled in base casting member slot 110, driving tool 146, severing and forming tool 149 and spacer 152 are positioned with respect to severing block 130 and support block 131 of subassembly 104 in the manner indicated in FIG. 9.

Driving tool 146, as shown primarily in FIGS. 7 and 9, has a C-shaped slot 181 adapted to receive the body portion 4 of the component and is of a height equal to that from the leads to the top of the component body. Severing and forming tool 149 is shown as having lead receiving and guide slots 186 and 187 which extend upwardly from the bottom of the tool and are disposed on the surface of tool 149 which is disposed in a sliding engagement with tool 146.

Lead severing and forming members 147,147' and spacer members 150,150' are normally biased in a vertically downward direction by means of tension-springs 190,190' and 191,191' respectively. The tension springs may be suitably affixed adjacent the lower ends thereof to any vertically stationary part of the apparatus, such as base castings 102,102' and adjacent their other or upper ends to pins 192,192' and 193,193' carried on lead severing and forming member and spacer member abutments 148,148' and 151,151' respectively.

The operational sequence of insertion head assembly 100 will be best understood by reference to FIGS. 8 and 9A–9D. As depicted in perspective in FIG. 8, film strip 2 lies between pivot arms 128 and 128' such that the component body portion 4 is aligned with slot 142 of component support block 131 and component leads 5a and 5c traverse a slot defined by sheering edge 133 and forming edge 134 of severing block 130 and support block 131, respectively. In FIG. 9A, subassemblies 103,103' are shown as being in their upper position and subassembly 104 is shown as being in its operative or component supporting position.

Spacer members 150,150', severing and forming members 147,147' and driver members 145,145' are positioned so that driving tools 146,146' are aligned between forming edges 134,134' and C-shaped slot 181 above component body 4; severing and forming tools 149,149' are aligned between shearing edges 133,133' and forming edges 134,134' and slots 186,186', 187 and 187' above leads 5*c*, 5*d*, 5*a* and 5*b* respectively; and spacers 152,152' are aligned with severing blocks 130,130'.

Referring only to subassembly 103 for purposes of brevity, it will be understood that in the up position shown in FIG. 9A, wedge-shaped end 171 of cam pin 154 is maintained in slot recess 172 of severing and forming member 147 by engagement of its curved end portion 170 with base casting slot side wall 113 in order to lock severing and forming member 147 for movement with driving member 145. When driving member 145 is driven downwardly, tool 149 of severing and forming member 147 is driven downwardly into engagement with component lead 5*a* and 5*c* and below upwardly facing shear block surface 133 to effect severing of the lead, and forming slots 186 and 187 are positioned in engagement with the severed lead to maintain such lead tight against upwardly facing support block surface 134.

Simultaneously, when driving member 145 is driven downwardly in the manner to be described, tool 152 of spacer member 150 is driven downardly into engagement with component lead termination 9*a*,9*c* and holds them securely to severing block 130. Immediately thereafter, downward movement of the spacer member is terminated due to engagement of member abutment 151 with base casting 102.

After termination of spacer member travel, severing and forming tool 149 and driving tool 146 are moved into the position shown in FIG. 9C, whereat forming of an L-shaped lead has been completed with the free end of such lead preferably projecting downwardly below the end of guide slots 186 and 187, and the driving tool has been placed in engagement with the non-deformed or horizontally extending portion of the L-shaped lead and body 4.

Figure 9D:
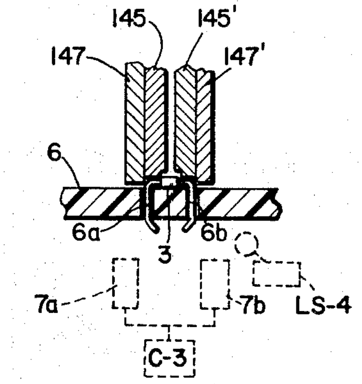

Upon continued downward movement of tools 146 and 149, subassembly 104 is removed from its operable position by the action of support driver 122 so as to permit free movement of the tools towards the insertion position shown in FIG. 9D, wherein the free end of the deformed lead is inserted into board aperture 6a.

Preferably, tools 146 and 149 move together until tool 149 is immediately adjacent the surface of circuit board 6 to insure accurate insertion of the lead, whereafter movement of tool 149 is terminated due to engagement of severing and forming member abutment 148 with base casting 102. Concurrently, severing and forming member 147 is disconnected from driving member 145, due to the presence of forming tool cam plate recess 116, which permits cam pin 154 to ride out of slot recess 172. Thereafter, tool 146 continues its downward movement in order to drive the lead downwardly through forming member guide slots 186 and 187 into fully inserted position.

Upon return movement of driving member 145, spring 190 functions to initially constrain movement of the severing and forming member 147 therewith due to frictional forces, until cam pin 154 is returned into alignment with forming members slot recess 172, whereupon cam pin 154 is forced to ride out of severing and forming tool cam plate recess 116 and be forced back into slot recess 172. In a similar manner, spring 191 functions to initially constrain spacer member 150.

Insertion tape guide and feed assembly 200 includes as in the case of insertion head assembly 100, a pair of guiding and feeding sections 201,201', which are of mirror image construction and disposed on opposite sides of apparatus reference plane 8. Refering to FIGS. 1–5, it will be understood that sections 201, 201' are mounted on framework mounting flange portions 20,20' for adjustment relative to apparatus reference plane 8 by means of brackets having first and second flange portions 202,202' and 203, 203', respectively. Bracket flange portions 202,202' may be locked in a desired adjusted position by means of clamping bolts 204,204' which are freely received within bracket flange slots such as slot 205 and threadedly received within mounting flanges 20,20'.

By now referring particularly to FIGS. 1, 3 and 4, it will be seen that sections 201,201' are provided with generally L-shaped lead guides 206,206' which are pivotally affixed to bracket flanges such as flange 202 by means of pin shafts 207, 207'. The guides are adapted to be maintained in the position illustrated particularly in the case of guide 206 in FIGS. 1 and 3, by means of thumb screws such as screw 208 which are threadably received within bracket flange portions 202,202'. Referring particularly to FIG. 3, it will be understood that sections 201,201' are also provided with stationary guides, shown only in the case of guide 207'', which are adapted to to cooperate with pivotal guides 206,206' to define a vertically extending component lead guide passageway 210.

Now referring to FIGS. 1 and 5 and particularly to assembly section 201', it will be seen that flange portion 203' is bored to receive a bearing insert 215' in which is journaled a shaft 216' having a component lead advancement wheel 217' carried thereon. As will be clearly seen by reference to FIG. 1, advancement wheels of each section are provided with radially extending annular ring portions 218,218' having a plurality of sprockets 219,219'which are disposed in alignment. As best seen in the case of section 201 when viewed in FIG. 3, the lower ends of pivotable guides 206,206' form continuations of the upwardly facing surfaces of severing blocks 130,130' and serve to maintain the film strip on sprockets 219,219' as successive components are presented to the insertion assembly by rotation of advancement wheels 217,217'. The spacing between sprockets 219,219' corresponds to the normal film strip sprocket hole spacing.

It will be noted at this point that assembly sections 201,201' may be adjusted with reference to apparatus reference plane 8, so as to permit adjustment of sprockets wheel 218,218' to engage the sprocket holes of component carrier filmstrip and thereby effect positioning of the components carried by such filmstrips in proper orientation with respect to apparatus reference plane 8, and thus sections 101 and 101' of the insertion head assembly. Also, it will be noted that the insertion section base castings 102 and 102' are each cut out, at 299, 299' to freely receive component advancement wheels 217,217' in order to permit relative adjustment of sections 101,101' after the distance between sections 201,201' has been set for a given width carrier film.

Component lead advancement wheels 217,217' may be simultaneously rotated to draw insertion film 2 downwardly through the lead guide slots by ratchet assemblies shown only in the case of section 201' in FIGS. 1 and 5 as including a ratchet wheel 221' having an integrally formed sleeve section 222' affixed for rotation with shaft 216' by a retaining pin 224'; a pivot member 225'; which is freely supported for rotation with respect to ratchet sleeve 222, by sleeve bushing 226'; and a ratchet paw 227' which is carried on pivot member pivot pin shaft 228'. Pivot member 225' is shown in FIGS. 1 and 5 as having a slot 229' which is adapted to slidably receive pin shaft 230' carried on section member 231' mounted for rotation with insertion film advancing shaft 18. Preferably, the number of teeth provided on ratchet wheel 221' corresponds to the number of slots on advancement wheel 217.

Now referring to FIG. 2, it will be understood that one end of shaft 18 projects outwardly beyond leg portion 13 and is adapted to carry flange portion 235, which is movably connected to piston rod 236 of pneumatic cylinder $C_1$ by means of pin shaft 237. The extent to which piston rod 236 may be retracted into cylinder $C_1$ upon operation thereof and thus the angle through which said shaft is rotated is controlled by limit switch LS3 mounted on stop block 240, which is adapted to engage the undersurface of piston shaft enlargement 241. Stop block 240 may be moved from the position shown in FIG. 2 by loosening locking bolt 242, which is slidably disposed in stop block slot 243 and threadably received within framework leg portion 13.

By viewing FIGS. 2 and 5 it will be understood that when piston rod 236 is retracted into engagement with limit switch LS3, ratchet paw 227' is stepped backwardly one tooth on ratchet wheel 221'. The number of ratchet teeth stepped while "cocking" the ratchet assembly determines the degree of feeding rotation of advancement wheels 217,217' when cylinder $C_1$ is actuated to extend rod 236. It will be apparent that stop block 240 may be employed to adjust the apparatus to handle insertion film having varied spacing between components. If desired, film having variable component spacings to conserve film length where both extremely large and relatively small components are to be employed, may be accommodated by employing remotely controlled means to adjustably position stop block between insertion cycles.

Limit switch LS3, shown in FIG. 2 as being carried in leg portion 13, is employed to sense clockwise rotation of shaft 18, which results in rotation of advancement wheels 217,217' to present a component to insertion head 100.

Referring particularly to FIGS. 3 and 4, it will be understood that driver members 145,145' may be simultaneously reciprocated within base casting slots 110,110' to move subassemblies 103,103' from their first or uppermost position, into component lead inserting position by means of actuating assembly 300.

Actuating mechanism 300 includes a generally U-shaped driving bracket 301, which is fixed for rotation with drive shaft 14 and provided with a half-round driving pin 302 adapted to be slidably received within transversely extending cutouts 199,199' of driver members 145,145'; a stop bracket 303, which is fixed for rotation with one end of drive shaft 14 projecting outwardly through leg portions 13; and a double acting pneumatic cylinder $C_2$. Cylinder $C_2$ is mounted on leg portion 13' by a bracket 304, and includes a piston rod 305 having a connecting pin 306, which is slidably received within stop bracket slot 307. By viewing FIG. 4, it will be apparent that when a cylinder $C_2$ is actuated to retract piston rod 305, stop bracket 303 is pivoted in a counterclockwise direction into the position indicated to effect driving rotation of drive shaft 14 and thus, reciprocation of drive members 145,145' towards their insertion position.

The other end of drive shaft 14, which is shown in FIGS. 1 and 2 as projecting outwardly through leg portion 13, is adapted to carry a pair of cam members 308,309. Cam members 308,309 are adapted to cooperate with limit switches LS1 and LS2, respectively, which are mounted on leg portion 13 and employed to indicate to the control circuit of the insertion apparatus shown in FIG. 10 that subassemblies 103,103' are in either their uppermost or insertion position.

In FIG. 4, stop bracket 303 is shown as being provided with a pin 310, which is adapted to be slidably received within slot 311 provided adjacent one end of a connecting rod 312. A U-shaped slot 313 in the other end of connecting rod 312 is slidably supported on return shaft 19. Secured to connecting rod 312 by machine screws 315 is an L-shaped camming member 314 having a camming surface 317 extending past the width of connecting rod 312. Trip member 316 lies between side wall 13' and connecting rod 312 and is secured to return shaft 19. In the position shown in FIG. 4, stop bracket 303 has driven connecting rod 312 down and camming member 314 has caused trip member 316 to rotate counterclockwise. The rotation of trip member 316 is translated to shaft 19 to place spring 138 under tension and move the support subassembly 104 to the retracted or inoperative position of FIG. 3 as subassemblies 103,103' are lowered for insertion. Upon the return of stop bracket 303 to its original position, connecting rod 312 and camming member 314 are rendered inoperative so as to permit spring 138 to return trip member 316, shaft 119 and support subassembly 104 to their original position.

OPERATION

In operation, a suitable memory element, such as a punched or magnetic tape, is coded to indicate the various component and circuit board parameters for each of the components to be supplied to the insertion to the apparatus during fabrication of a given circuit board. Thus, for each component to be inserted, the tape is coded to indicate a given X-Y board position. The coded tape, not shown, is then employed to control operation of the control circuit of the apparatus, generally designated as 500 in FIG. 10, in the manner now to be described.

Operation is initiated by feeding the coded tape in a step-wise manner past a suitable tape reader 501, which signals a control mechanism 502 to begin component insertion cycle. Control 502 initiates the insertion cycle by actuating circuit board supporting table positioning motors $M_1$, $M_2$ to drive the circuit board into a given X-Y position, whereat prepunched board apertures *6a,6b,6c,6d* are disposed in alignment beneath insertion head assembly 100. When the circuit board is in position, control 502 sends a signal to handler 504 to proceed.

Handler 504 thereafter initiates operation of control cylinders $C_1$, $C_2$, and $C_3$ in the following sequence. First, $C_1$ is operated to retract piston rod 236, whereby shaft 18 is rotated in a clockwise direction, when viewed in FIG. 5 to effect driving rotation of advancement wheels 217,217' via the ratchet assemblies to present the leads of a component to be inserted immediately adjacent the upwardly facing shear block surfaces 133,133', as viewed in FIGS. 1 and 8 and 9. Full driving rotation of shaft 18 closes limit switch LS3 to signal handler 504 that a component is positioned. Handler 504 then actuates cylinder $C_2$, which retracts piston rod 305 in order to drive members 145,145' into their insertion position. When members 145,145' are moved into insertion position, cam 309 closes limit switch LS2 to signal the handler that a component has been inserted, whereupon the handler actuates cylinder $C_3$ to drive clinching devices *7a,7b* into lead clinching position and close limit switch LS4. Closing of switch LS4 signals handler 504 to deactivate cylinders $C_1$, $C_2$, and $C_3$ in order to return the feeding, insertion and clinching elements of the insertion apparatus to their original or inoperative positions.

As soon as operation of handler 504 is initiated, the handler signals control 502 to initiate feeding of the coded tape and reading of data corresponding to the next component to be inserted. Upon returning members 145,145' to their original positions at the completion of the insertion cycle, cam 308 closes limit switch LS1, whereupon handler 504 gives a permit signal to control 502 to proceed with a subsequent operational cycle.

If defect detector 503 senses the presence of defect indicating aperture 3 adjacent a film mounted component, it sends a signal to control 502. Depending upon the location of photoelectric or pneumatic detector 503, control 502 will immediately use the defect signal, or store it for use when the defective component is positioned to be inserted. Once the defective component is to be fed onto support subassembly 104, the control 502 sends a second feed signal to handler 504 so that cylinder $C_1$ is actuated a second time to feed the next component and bypass the defective component. Except for this second activation of cylinder $C_1$, the operation cycle is the same.

While only the preferred embodiment of the present invention has been described in detail, various modifications thereof and additions thereto will become apparent to those skilled in the art in view of the foregoing description. For example, the machine has been described for use specifically with components having two pairs of leads extending, one pair from each end thereof, while one skilled in the art would recognize that the axial lead component could have more than two leads extending from an end, suitable provision being made in the operating mechanism to cut, bend and insert the multiple leads. Further, it will likely occur to one skilled in the art that the present invention has utility in processing components where it is only desired to trim and deform components to provide processed components which may thereafter be inserted by other insertion apparatus.

Accordingly, the scope of protection for the present invention is to be limited only by the scope of the appended claims.

What is claimed:

1. An apparatus for processing filmstrip mounted electronic components, each having a body portion and leads extending from opposite sides thereof comprising:

severing means for separating said component from said filmstrip;

feed means adapted to engage said filmstrip for transporting said film mounted components to said severing means;

forming means for bending said leads at substantially right angles to the axis of said separated component; and driver means for driving said bend leads into apertures in a circuit board.

2. An apparatus as in claim 1 wherein said feed means transports one electronic component at a time.

3. An apparatus as in claim 2 further including control means for activating said feed means, severing means, forming means, and driver means in a cyclic relation.

4. An apparatus as in claim 3 wherein said filmstrip contains indicia of a defective component and said control means includes sensor means for detecting said defect indicia.

5. An apparatus as in claim 4 wherein said control means actuates said feed means twice in response to a defect signal from said sensor means to prevent insertion of said defective component.

6. An apparatus for inserting filmstrip mounted electronic components having a body portion and leads extending from opposite sides thereof into apertures in a circuit board comprising:

support means adapted to receive said film and support said component;

feed means for engaging and advancing said film so as to provide one component at a time to said support means;

severing means for separating said component from said filmstrip;

forming means for deforming said leads to produce a generally L-shaped leads; and driver means for driving said L-shaped leads into said apertures.

7. An apparatus as in claim 6 including support driver means for moving said support means to an operative position for feeding, severing and forming and to an inoperative position during driving.

8. An apparatus as in claim 7 wherein:

said driver means includes a slot adapted to receive said component's body portion;

said forming means includes a plurality of grooves adapted to receive a corresponding plurality of leads to be deformed; and said component being supported by said driver means and said forming means when said support means occupies said inoperative position.

9. An apparatus as in claim 7 further including control means for activating said feed means, support drive means, severing means, forming means and driver means in a cyclic relationship.

10. An apparatus as in claim 9 wherein said filmstrip contains indicia of a defective component and said control means includes sensor means for detecting said defect indicia.

11. An apparatus as in claim 10 wherein said control means actuates said feed means twice in response to a defect signal from said sensor means to prevent insertion of said defective component.

12. An apparatus as in claim 10 wherein said defect indicia is a defect aperture and said sensor means comprises a pneumatic source and a pneumatic sensor.

13. An apparatus as in claim 10 wherein said defect indicia is a defect aperture and said sensor means comprises a light source and a photo cell.

14. An apparatus as in claim 7 wherein said support means comprises:

a horizontal carriage adapted to receive said film and support said component; and vertical support members secured at opposite ends of said carriage adapted to receive said filmstrip therebetween and adapted to pivotally mount said carriage to a housing;

said carriage having a horizontal slot adapted to receive and support said component's bodies.

15. An apparatus as in claim 14 wherein:

said horizontal carriage includes two vertical slots, one on each side of said horizontal slot;

said component's body being supported by said horizontal slot and said leads traversing said vertical slots and being supported by said horizontal carriage.

16. An apparatus as in claim 15 with said horizontal slot each being adapted to receive a severing means and a forming means such that said component leads are severed from said film at the horizontal edges of said vertical slots closest to said vertical support members, and deformed about the horizontal edges of said vertical slots closest to said horizontal slots.

17. An apparatus as in claim 16 wherein:

said driver means includes a slot adapted to receive said component's body portion;

said forming means includes a plurality of vertical grooves adapted to receive a corresponding plurality of leads to be deformed; and said component being supported by said driver means and said forming means when said support means occupies said inoperative position.

18. An apparatus as in claim 16 wherein said component leads terminate on said filmstrip and said body portion lies in an aperture in said filmstrip; said horizontal edges of said carriage's vertical slots closest to said vertical support members being separated by the width of said filmstrip aperture.

19. An apparatus as in claim 18 wherein said driver means, severing means and forming means are adapted to fit within said filmstrip aperture.

20. An apparatus as in claim 14 wherein said feed means comprises a pair of sprocket wheels for supporting said filmstrip at its edges and advancing said filmstrip by the engagement of said filmstrip's sprocket apertures.

21. An apparatus as in claim 6 wherein said severing means and said forming means comprises a single tool, and wherein said support means includes a slot adapted to receive said severing and forming tool such that said component leads are severed from said film at a first lateral edge of said slot and deformed about a second lateral edge of said slot.

* * * * *